United States Patent [19]

Miller et al.

[11] Patent Number: 4,790,634
[45] Date of Patent: Dec. 13, 1988

[54] BISTABLE LIQUID CRYSTAL IN A FABRY-PEROT ETALON

[75] Inventors: Alan Miller; Jacqueline Staromlynska, both of Worcestershire, England

[73] Assignee: The Secretary of State for Defence in her Britannic Majesty's Government of the United Kingdom of Great Britain and Northern Ireland, London, England

[21] Appl. No.: 93,039

[22] Filed: Sep. 4, 1987

[30] Foreign Application Priority Data

Sep. 5, 1986 [GB] United Kingdom ............... 8621439

[51] Int. Cl.$^4$ .......................... G02F 1/13; G01B 9/02; G02B 5/23
[52] U.S. Cl. .............................. 350/347 V; 350/354; 350/393; 356/352
[58] Field of Search ................ 350/393, 347 V, 351, 350/346, 354; 356/352

[56] References Cited

U.S. PATENT DOCUMENTS

| | | | |
|---|---|---|---|
| 3,891,307 | 6/1975 | Tsukamoto et al. | 350/346 |
| 4,012,699 | 3/1977 | Gibbs et al. | 350/354 |
| 4,196,396 | 4/1980 | Smith | 350/393 |
| 4,558,923 | 12/1985 | Hoffman et al. | 350/393 |
| 4,595,292 | 6/1986 | Amodeo et al. | 350/347 V |
| 4,630,898 | 12/1986 | Jewell | 350/354 |
| 4,664,483 | 5/1987 | Van Sprang et al. | 350/346 |
| 4,701,030 | 10/1987 | Jewell | 350/354 |

OTHER PUBLICATIONS

Khoo et al., "Optical Bistability Using a Nematic Liquid Crystal Film in a Fabry-Perot Cavity", *J. Applied Physics* 53 (11), Nov. 1982, pp. 7599-7601.

Cheung et al., "Optical Bistability and Self-Oscillation of a Non-Linear Fabry-Perot Interferometer Filled with a Nematric-Liquid-Crystal Film", *Optics Letters*, vol. 8, No. 1, Jan. 1983, pp. 39-41.

*Primary Examiner*—Stanley D. Miller
*Assistant Examiner*—Anita E. Pellman
*Attorney, Agent, or Firm*—Nixon & Vanderhye

[57] ABSTRACT

An optically bistable device comprises a Fabry-Perot etalon containing intracavity liquid crystal material. Etalon mirros of deposited silver are overlaid on indium tin oxide electrodes. The electrodes provide electrical biasing means for the material, which exhibits both optical nonlinearity and electro-optic tunability of refractive index. The etalon has an interference fringe maximum at a wavelength $\lambda_{m1}$. the fringe is tunable to $\lambda_{m2}$ by applying a bias voltage across the mirrors. A light beam illuminates the etalon, the beam having a wavelength $\lambda_s$ where $\lambda_{m2}$ is between $\lambda_s$ and $\lambda_{m1}$. The beam intensity is sufficient to induce bistable etalon switching for a fringe at $\lambda_{m2}$ but not for a fringe at $\lambda_{m1}$. Tuning the etalon fringe electro-optically from $\lambda_{m1}$ to $\lambda_{m2}$ initiates optical bistability without the prior art requirement of either variable light intensity or an external electrical feedback loop.

8 Claims, 7 Drawing Sheets

BISTABLE LIQUID CRYSTAL IN A FABRY-PEROT ETALON

The invention relates to an optically bistable device, and more particularly to such a device in the form of a Fabry-Perot etalon.

Optical bistability in Fabry-Perot etalons is known, and there are two known techniques for achieving it. The first approach is described in a standard textbook, "Optical Bistability: Controlling Light With Light", H M. Gibbs, Academic Press, New York, 1985. In essence, this approach employs an optically nonlinear material in a Fabry-Perot etalon cavity. The etalon is illuminated with a comparatively low power light beam at a wavelength near an etalon transmission maximum or interference fringe. As the power light beam is increased, by virtue of optical nonlinearity the cavity material refractive index changes and with it the optical path length in the cavity. This changes the position of the etalon transmission maximum with respect to wavelength. The light beam wavelength then lies closer to the centre of an etalon interference fringe, and etalon transmission switches from a low to a high value. This may be referred to as "all optical" bistability, in which a change in the input optical power induces switching, Khoo, Normandin and So describe an example of this in J. Appl. Phys. 53(11), November 1982. They employed a liquid crystal layer 50 $\mu$m thick retained between two microscope slides, this cell being arranged between the mirrors of a Fabry-Perot etalon. The etalon mirror separation was variale, and optical bistability as a function of input optical power was demonstrated for four mirror separation values. In Optics Letters, Vol. 8, No. 1, January 1983, Cheung, Durbin and Shen demonstrated optical bistability as a function of input optical power in the presence of a magnetic field. They employed a Fabry-Perot etalon having an 83 $\mu$m cavity width filled with liquid crystal material. Multiple bistable loops were observed as the input optical power was varied between 0 and 40 Watt cm$^{-2}$ with $|B| = 1.3\ kOe$.

The second approach to obtaining optical bistability involves the use of electrical feedback (as opposed to optical feedback). This is described by Stewart, Bennion and Goodwin, Phil. Trans. R. Soc. Lond. A313 (1984) 401. In this technique, a Fabry-Perot etalon is employed containing an intracavity electro-optic medium. An electric field is applied to the medium. Light transmitted by the etalon produces an electrical signal at a detector, and the signal is fed back to control the magnitude of the electric field in the medium. The refractive index of the intracavity medium varies in response to the electric field. Positive feedback is arranged to occur; ie an increase in input optical power is arranged to change the electric field such that an etalon cavity transmission maximum or interference fringe occurs closer to the input optical wavelength.

The disadvantage of either of the foregoing prior art approaches is that they require a change in the input optical power to induce optical bistability. This may be a consequence of internal optical feedback in a nonlinear intracavity material, or alternatively it may be a consequence of electrical feedback via an external circuit. However, for many electro-optic signal processing applications it is required to employ a constant input optical power level. This is because it is frequently inconvenient to vary optical power, which requires for example cumbersome non-ideal optical modulators.

It is an object of the present invention to provide an optically bistable device which does not require a change in input optical power to induce optical bistability.

The present invention provides an optically bistable device including a Fabry-Perot etalon containing intracavity optically nonlinear material and arranged to exhibit optical bistability, and wherein:

(1) the cavity material refractive index is electro-optically tunable via etalon biassing means to move an etalon interference fringe maximum from a wavelength $\lambda_{m1}$ to a wavelength $\lambda_{m2}$.

(2) a light source having a wavelength $\lambda_s$ is arranged to pass light through the etlaon, where $\lambda_{m2}$ lies between $\lambda_{m1}$ and $\lambda_s$, $\lambda_s$ and the source intensity being arranged to initiate optical bistability at an etalon fringe wavelength of $\lambda_{m2}$ but to be inappropriate for bistability at a fringe wavelength of $\lambda_{m1}$, and (3) the etalon biassing means are connected to a variable voltage source arranged at least for etalon fringe maximum tuning from $\lambda_{m1}$ to $\lambda_{m2}$.

The invention provides two major advantages over prior art devices. Firstly, it is capable of construction in simple form at low cost; in one embodiment the cavity material is a layer of liquid crystal material, and the cost is very small as is typical of liquid crystal devices generally. Secondly, the invention provides optical bistability induced by change in applied bias voltage. It is not necessary to change the input optical intensity or provide an external electrical feedback loop as in the prior art. The invention accordingly provides fast switching by virtue of the positive feedback or regenerative action associated with optical bistability, but without the prior art intensity modulation or electrical feedback complications. It is the electro-optic equivalent of a Schmitt trigger circuit.

The etalon cavity material preferably has an optical nonlinear refraction parameter $n_2$ at least equal to $10^{-6}$ cm$^2$/Watt to allow operation at input powers in the milliwatt region or below. In addition, the material preferably has an electro-optic coefficient and thickness appropriate for cavity phase tuning through at least a bistable loop in response to a bias voltage change of 10 Volts. The cavity material may be a liquid crystal material having a birefringence of at least 0.05, and preferably in the range 0.09 to 0.11.

The etalon may incorporate mirrors which are optically partially absorbing to produce the temperature rise stimulus required for optical bistability. Alternatively, the cavity material itself may be absorbing, such as a liquid crystal material containing a dye component having an appropriately located optical absorption band. The invention may alternatively be a Fabry-Perot etalon in which the cavity is a multiple quantum well structure exhibiting optical nonlinearity and electro-optic tunability.

In an alternative aspect, the invention provides a method of obtaining optical bistability including the steps of:

(1) providing a Fabry-Perot etalon arranged for optical bistability and containing intracavity optically nonlinear material, the cavity material refractive index being electro-optically tunable via etalon biassing means to move an etalon interference fringe from a wavelength $\lambda_{m1}$ to a wavelength $\lambda_{m2}$.

(2) illuminating the etalon with light having a wavelength $\lambda_s$, where $\lambda_{m2}$ lies between $\lambda_{m1}$ and $\lambda_s$, $\lambda_s$ and the light intensity being arranged to initiate bistability at an etalon fringe wavelength of $\lambda_{m2}$ but to be inappropriate for bistability at a fringe wavelength of $\lambda_{m1}$, and (3) altering etalon bias to produce etalon fringe maximum tuning from $\lambda_{m1}$ to $\lambda_{m2}$.

In order that the invention might be more fully understood, embodiments thereof will now be described with reference to the accompanying drawings, in which.

Figure 1:
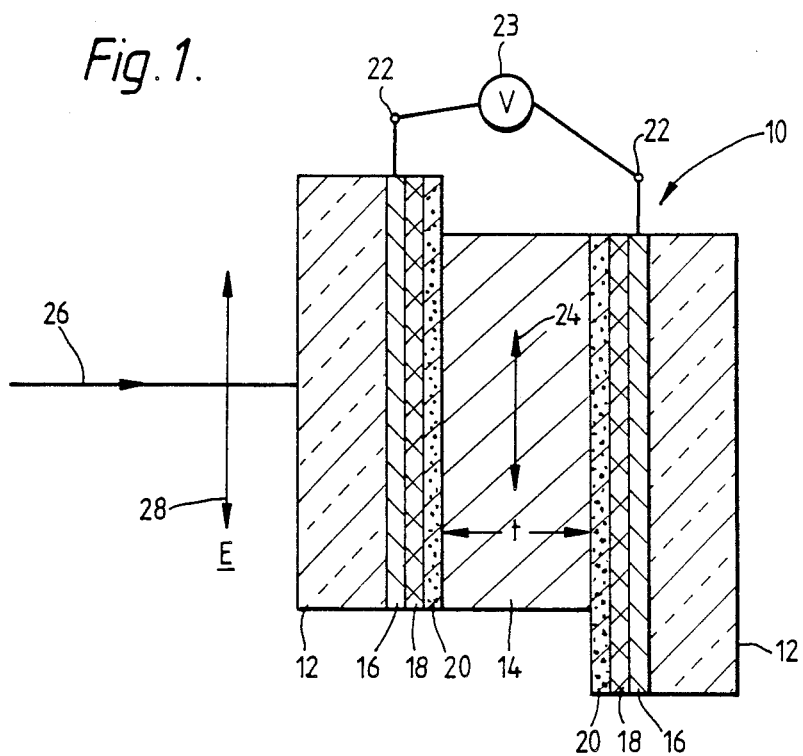
FIG. 1 is a sectional view of an electro-optic device of the invention.

Referring to FIG. 1, there is shown a sectional view of an optically bistable electro-optic Fabry-Perot etalon 10 forming part of an optically bistable device of the invention. The etalon 10 comprises two glass plates 12 acting as cell walls for a liquid crystal maerial (LCM) layer 14 contained therebetween. The glass plates 12 have respective internal wall coating layers of indium tin oxide (ITO) 16, evaporated silver 18 20 nm in thickness and evaporated silicon oxide 20 (SiO). These layers are successively disposed so that the structure is glass-/ITO/Ag/SiO/liquid crystal, ie 12/16/18/20/14 from the left of the etalon 10 or the reverse of this order from the right. The ITO layers 16 are electrodes having electrical bias connections 22 connected to a variable voltage source 23.

The liquid crystal material of layer 14 is referred to as 3/5/7 PCH, and consists of a three component mixture of materials each of the cyano-phenyl-cyclohexane-alkyl variety. The components differ only in that their alkyl chain lengths vary. Their structure is:

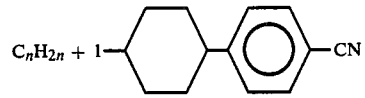

where the components have respective values of n of 3, 5 and 7. The mixture proportions are 30% n=3, 40% n=5 and 30% n=7.

The LCM layer 14 is 10 microns thick. More generally, a layer thickness in the range 5 to 20 microns may be employed. The ITO layers 16 are transparent electrodes of known kind for establishing a voltage across the LCM layer 14. The silver layers 18 are partially transmissive as required for a Fabry-Perot etalon. In this example they are 70% reflecting, although a reflectivity of 30% or more is adequate. A preferred range of reflectivity is 80% to 90%. The SiO layers 20 are agents for aligning the long axes of the liquid crystal molecules of layer 14 in the plane of the drawing parallel to the surfaces of the glass plates 12 and layers 16 to 20, as indicated by an arrow 24. This alignment is alterable by applying a bias voltage across the electrodes 16. Other alignment agents such as rubbed polyamide may also be used, as is well known in the field of liquid crystal devices. A light beam 26 is incident on the etalon 10 perpendicular to the layers 14 to 20. The light beam has an electric vector 28 parallel to the liquid crystal molecule orientation 24.

The liquid crystal material of layer 14 has a large optical nonlinearity, ie the refractive index n is strongly dependent on the light intensity in the material. In the nonlinear optics field, this nonlinearity is expressed by the parameter $n_2$, which should preferably be at least $10^{-6}$ cm$^2$/Watt for the purpose of the invention. The material of layer 14 should preferably also have an electro-optic coefficient which is sufficiently large to permit tuning of the optical phase change between mirror layers 18 through an excursion of at least $\pi/2$ ($\lambda/4$) in response to a change in bias of 10 Volts, and preferably through $\pi$ to $2\pi$. For a thickness of layer 14 of 10 microns (typical), 10 Volts corresponds to an electric field of $10^4$ Volts/cm. Layer 14 may be composed of materials other than liquid crystals provided that sufficiently large optical nonlinearity and electro-optic coefficients are exhibited. However, the foregoing properties required of layer 14 may be collectively expressed in the case of liquid crystal materials by stating that the material birefringence should be at least 0.05, a typical range being 0.05 to 0.15 and preferably 0.09 to 0.11. A further criterion is that the liquid crystal absorption coefficient $\alpha$ should preferably be less than 2000 cm$^{-1}$ to maintain sufficient etalon finesse.

The mode of operation of the etalon 10 will now be described in outline, a more detailed analysis being given later. As has been said, the liquid crystal molecules are aligned in the absence of bias in the direction of arrow 24 parallel to the electric vector 28 of the illuminating light beam 26, and the beam 26 experiences a liquid crystal refractive index of 1.61. Application of a bias voltage across electrodes 16 rotates the molecular orientation towards the electric field direction, ie the direction of beam 26 and the perpendicular to layers 14 to 20. As is well known in the liquid crystal device field, the bias is AC, the molecules responding to the RMS value. A sufficiently large electric field will reorientate the liquid crystal molecules to substantial parallelism to the electric field direction. The liquid crystal refractive index presented to the light beam 26 then becomes 1.49. The change in refractive index Δn occurring in the liquid crystal maerial 3/5/7 PCH preferred to above is 0.12 for a change in molecular orientation from parallel to perpendicular to the etalon layers 14 to 20. For a liquid crystal layer thickness of 10 microns and at a light beam wavelength of 500 nm, this birefringence value of 0.12 produces a Fabry-perot fringe shift of about 4 complete fringes when the bias applied across electrodes 16 changes by 5 Volts RMS. The etalon 10 may accordingly be tuned in phase across, towards or away from an interference fringe at a specific optical wavelength by adjusting the bias voltage.

Figure 2:
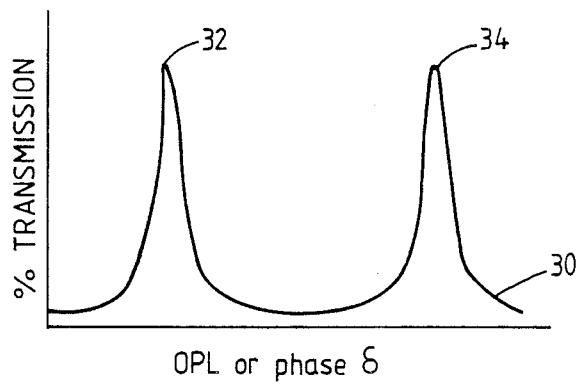
FIG. 2 is a graph of optical transmission against optical path length (OPL) or cavity phase for the FIG. 1 device.

Referring now also to FIG. 2, there is shown a tupical graph 30 of Fabry-Perot etalon transmission against optical path length (OPL) or phase δ (arbitrary units). The graph 30 has two transmission maxima or interference fringes 32 and 34. A maximum in transmission occurs when the phase $\delta = \pi$, δ being given by:

$$\delta = \frac{2\pi nt}{\lambda} \qquad (1)$$

where
  n = refractive index of material with etalon,
  t = thickness of material within etalon (cavity length), and
  λ = wavelength of light transmitted by etalon.

In the present invention the phase δ is tuned electrically by varying the bias voltage to change the refractive index n in Equation (1).

Figure 3:
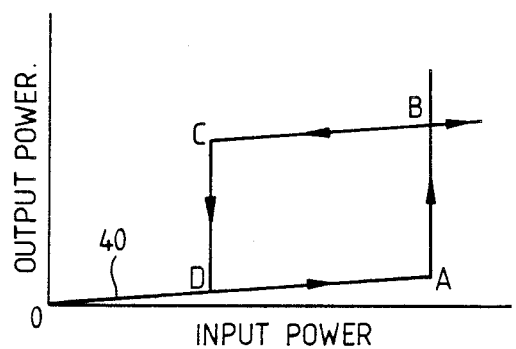
FIG. 3 is a graph illustrating optical bistability in an idealised Fabry-Perot etalon.

Referring now also to FIG. 3, there is shown a graph 40 of Input Power versus Output Power (arbitrary units) for an idealised Fabry-Perot etalon exhibiting optical bistability. The etalon contains a cavity material having a high $X^3$ value, this being a coefficient indicating degree of optical nonlinearity. As the graph 40 shows, the output power or light intensity increases linearly with input power from zero at the origin 0 to a first point of bistability A. The refractive index n of the cavity material is a function of temperature. The cavity material temperature increases by virtue of the optical power in the etalon, sufficiently so that the etalon phase δ reaches a value close to that appropriate for an interference fringe maximum. Positive feedback or regenerative action then takes place. The increase in transmission which occurs on approach to an interference fringe produces a further change in refractive index. This shifts the phase δ closer to the fringe maximum increasing transmission and changing the refractive index once more, and so on. The effect is that the output power or transmitted intensity switches very rapidly from A to B in FIG. 3 by virtue of the positive feedback associated with optical bistability.

As the input power is reduced, the output power reduces as indicated by the line BC. When the point C is reached, the optical bistability effect occurs once more but in the reverse direction from high to low transmission or output power. The amount of input optical power required to reach the first switching point A is dependent on the cavity phase δ of equation (1), which in turn depends on input wavelength, cavity material refractive index at low power and cavity thickness t. If the cavity phase δ at a particular wavelength is relatively far from that appropriate for a fringe maximum, a relatively large input optical power level is required to produce switching. If however δ is close to a fringe maximum, only a comparatively small input power level will affect switching.

Referring once more to FIG. 1, in the present invention the etalon phase δ can be tuned to approach a fringe maximum simply by biassing the electrodes 16 appropriately. Switching between optically bistable states may then be initiated at a constant input power or light intensity level under bias voltage control. As is well known in electro-optics, it is considerably simpler and faster to change a bias voltage than to alter a light intensity. To alter light intensity in a laser for example, one requires a cumbersome variable optical attenuator in the input laser beam or means for changing the laser output power, both of which are slow to operate. The present invention accordingly provides an electro-optic bistable switch of elegantly simple construction which is switchable faster than an otherwise equivalent device lacking positive optical feedback. It may be employed for example to impose a digital code modulation upon a laser beam for telecommunications purposes. In this application, the invention provides the advantage that digital pulse rising and falling edges are of short duration allowing high bit transmission rates. By virtue of its bistability the invention may also provide a restorable optical memory for the electrical input. Other applications of the invention include tunable optical filters, optical modulators and spatial light modulators (light valves).

As has been said, in the foregoing embodiment optical bistability occurs in response to etalon intracavity material temperature rise. The temperature rise mechanism in the etalon 10 of FIG. 1 arises from optical absorption in the silver etalon mirrors 18. Absorption in the liquid crystal layer 14 is insignificant. Dielectric multilayer mirrors may alternatively be employed. Since dielectric mirrors do not absorb appreciably, the liquid crystal 14 should be rendered slightly absorbing by admixture of a dye component of known kind having an appropriately located absorption band.

In any device of the invention such as etalon 10, there is a minimum light intensity below which switching will not occur regardless of applied electric field. This minimum will depend on etalon mirror reflectivities and mirror or cavity mterial absorption, and arises because positive feedback requires a degree of input power to initiate. Switching may however be obtained at bias voltages in the region of 10 Volts when cavity materials, optical wavelengths and device structures are chosen appropriately. In other respects the wavelength in particular is unconstrained provided that a cavity material is available having appropriate properties at that wavelength. Materials such as liquid crystals and wide band gap II–VI semiconductors such as ZnS and ZnSe provide a large spectral range.

The operation of the etalon 10 will now be analysed in more detail.

The Fabry-Perot equations relating transmission, T, and reflection, R, to the front and back mirror reflectivities, $R_F$ and $R_B$ respectively, the cavity layer absorption coefficient, α and the thickness t are, $$T = \frac{A}{1 + F\sin^2\delta} \qquad (2)$$

$$R = \frac{B + F\sin^2\delta}{1 + F\sin^2\delta} \qquad (3)$$

where
$F = 4R_a/(1 - R_a)^2$

-continued
$$A = e^{-\alpha t}(1 - R_F)(1 - R_B)/(1 - R_\alpha)^2$$
$$B = R_F[1 - (R_\alpha/R_F)]^2/(1 - R_\alpha)^2$$
$$R_\alpha = (R_F R_B)^{\frac{1}{2}} e^{-\alpha t}$$

and $\delta = 2\pi nt/\lambda =$ etalon cavity phase, where n and t are the cavity material refractive index and thickness and $\lambda$ is the light beam wavelength in free space.

The cavity finesse is $F_c = \pi F^{\frac{1}{2}}/2$.

For the purpose of this analysis, it is assumed that:
(i) absorption in the LCM layer 14 is linear, and
(ii) refractive index change $\Delta n$ is proportional to average cavity intensity, $I_c$, within the etalon.

Consider first only the optical nonlinearity or change $\Delta n$ in the cavity material refractive index, and given by $$\Delta n = n_2 I_c \quad (4)$$

where $n_2$ (the nonlinear refraction) is a constant by virtue of (ii) above, and $$\delta = \delta_o + \delta_{op}$$

ie $$\delta = \delta_o + \gamma I_c$$

where $\delta_o$ and $\delta_{op}$ are respectively the initial cavity phase and the phase change induced by cavity intensity change, and $\gamma$ is the change in $\delta_{op}$ per unit cavity intensity change.

The phenomenon of optical bistability in an etalon of the invention will now be described with reference to FIGS. 4 to 11, these comprising graphs in which ordinate and abscissa values are expressed as dimensionless quantities to simplify analysis.

Figure 4:
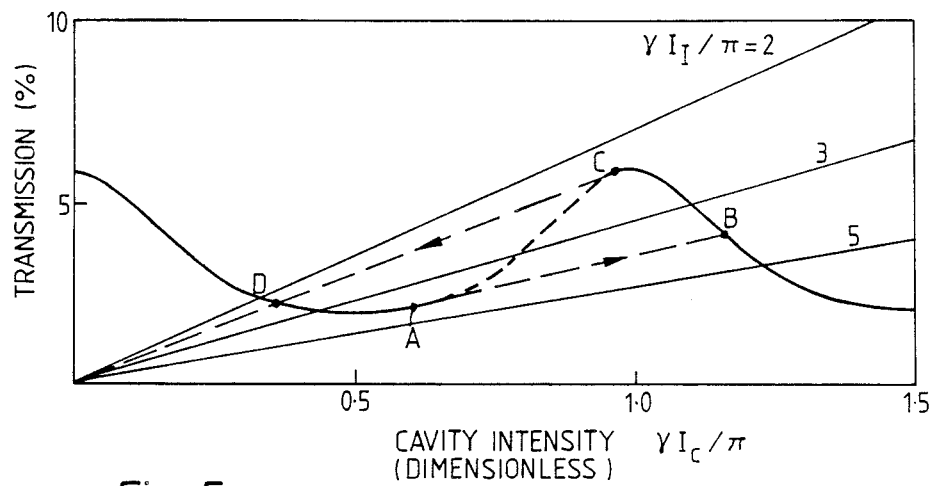
FIG. 4 is a graph of the oscillatory Airy transmission function of a Fabry-Perot etalon against cavity intensity, and is crossed by straight lines of constant incident intensity.

An example of the oscillator Airy transmission function T of equation (2) is shown for a low cavity finesse case in FIG. 4 for $R_F = R_B = 70\%$ and $\alpha t = 1$. The function is plotted against dimensionless cavity intensity $\gamma I_c/\pi$. For the purpose of this analysis, it is assumed that the rate of change of intracavity material refractive index with cavity intensity, ie $dn/dI_c$, is positive. The transmission T at low cavity intensities is determined by the initial phase, $\delta_o$. The input-output characteristics of the nonlinear etalon are sensitive to the value of this initial phase value. In FIG. 4 $\delta_o = 0$.

The relationship between cavity intensity $I_c$ and incident, reflected and transmitted intensity, $I_1$, R and T respectively, leads to the additional criteria:

$$\frac{T}{I_C} = \frac{C_T}{I_I} \quad (6)$$

and $$\frac{(1 - R)}{I_C} = \frac{C_R}{I_I} \quad (7)$$

where $C_T$ and $C_R$ are given by $$C_T = \frac{\alpha t e^{-\alpha t}(1 - R_B)}{(1 - e^{-\alpha t})(1 + R_B e^{-\alpha t})} \quad (8)$$

$$C_R = \frac{\alpha t[1 - (R_\alpha^2/R_F)]}{(1 - e^{\alpha t})(1 + R_B e^{-\alpha t})} \quad (9)$$

Figure 5:
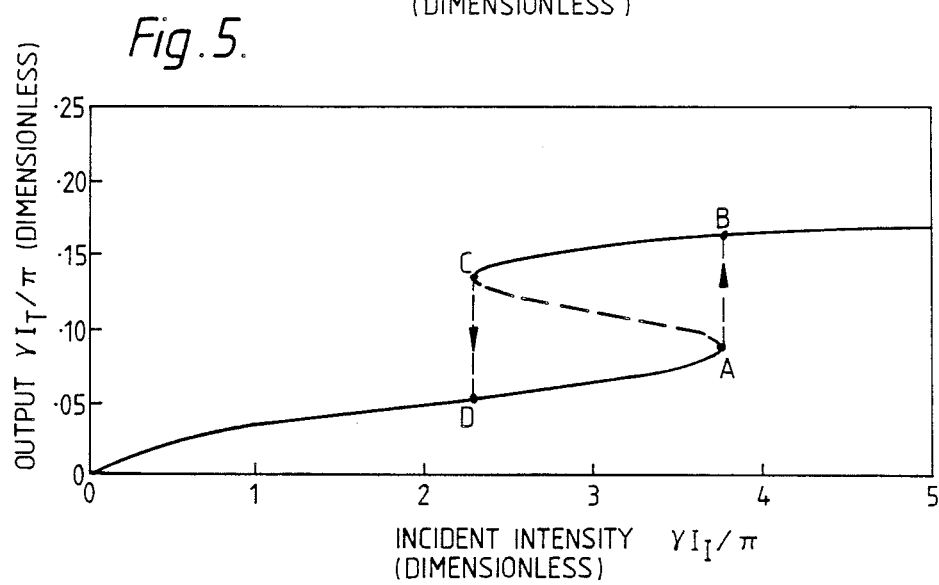
FIG. 5 illustrates the function of FIG. 4 plotted against incident intensity to show typical optical hysteresis or bistable loops.

Equations (1) and (6) are solved simultaneously to eliminate $I_C$ and describe the nonlinear Fabry-Perot transmission as a function of incident intensity ($\delta$ in equation (1) is a function of $I_C$). This is shown in FIG. 5. Equation (6) describes straight lines through the origin as shown in FIG. 4; the slopes of these lines represent different values of incident intensity, the shallower slopes corresponding to higher intensities. Bistability occurs at multiple crossings of the periodic and straight lines. Thus on increasing the dimensionless incident intensity $\gamma I_I/\pi$ from 3 to 4 in FIG. 5, the transmission switches from A to B; on decreasing the intensity again, the switch down is from C to D resulting in input-output hysteresis.

Applying a bias voltage to the Fabry-Perot etalon 10 causes an additional change in the refractive index. For a fixed light intensity and a variable bias voltage producing an electric field E across the etalon, a total phase change takes place given by:

$$\delta = \delta_o + \delta_{op} + \delta_{el} \quad (10)$$

ie $$\delta = \delta_o + \gamma I_C + \epsilon E \quad (11)$$

where $\epsilon$ is an electro-optic constant representing the electric field dependence on the cavity phase and $\delta_{el}$ is the change in cavity phase due to electric field.

Figure 6:
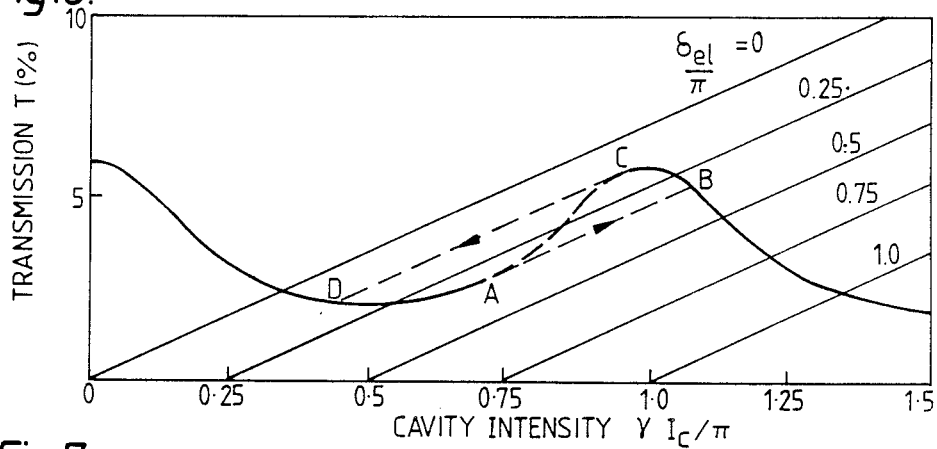
FIG. 6 shows the Airy function of FIG. 4 plotted against cavity intensity and crossed by lines of constant cavity phase shift due to applied electric field.
Figure 7:
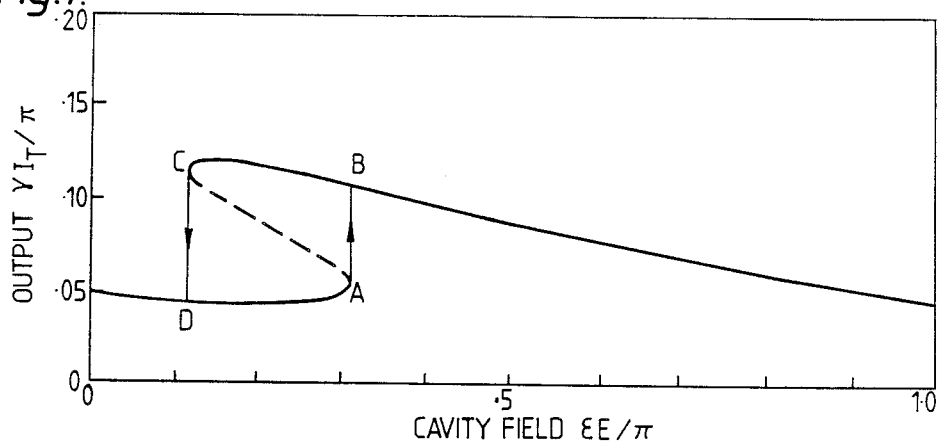
FIGS. 7 and 8 are graphs of output intensity versus electric field applied to the cavity for positive and negative values of dn/de, which give rise to anticlockwise and clockwise bistable loops respectively.
Figure 8:
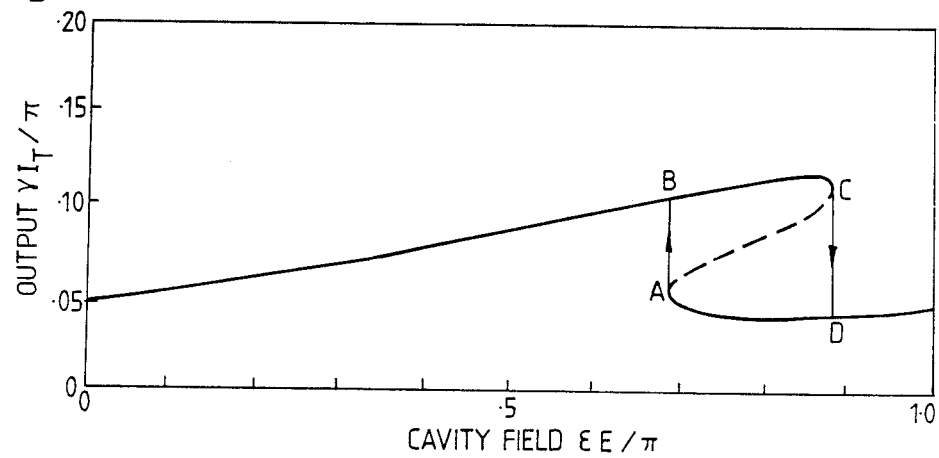

The condition for an incident intensity, $\gamma I_I = 2\pi$ is shown again for the foregoing example in FIG. 6 for a series of values of $\delta_{el}/\pi$ from 0 to 1. This example assumes positive values of $dn/d\epsilon$. A multiple crossing occurs at about $\delta_{el} = 0.25\pi$. Thus for a fixed incident intensity, increasing the electric field will cause the cavity to switch from point A to B on the way up to C to D on the way down. FIG. 7 is equivalent to FIG. 6 replotted as a function of phase shift due to the electric field E in units of $\pi$. It shows bistability of the optical output with an anti-clockwise loop with variation in electronic field. If $dn/d\epsilon$ is of opposite sign to $dn/dI_c$, then the characteristic of FIG. 8 is obtained with a clockwise loop.

Figure 9:
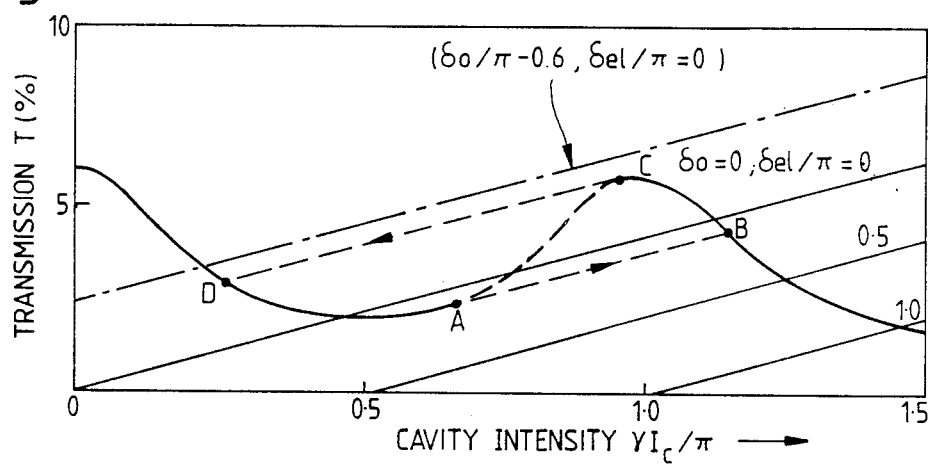
FIGS. 9 and 10 are equivalent to FIGS. 6 and 7 at increased input intensity.
Figure 10:
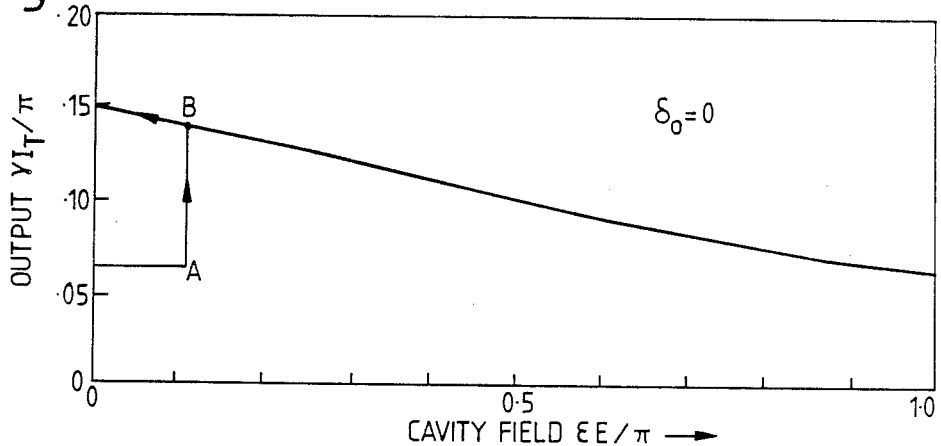
Figure 11:
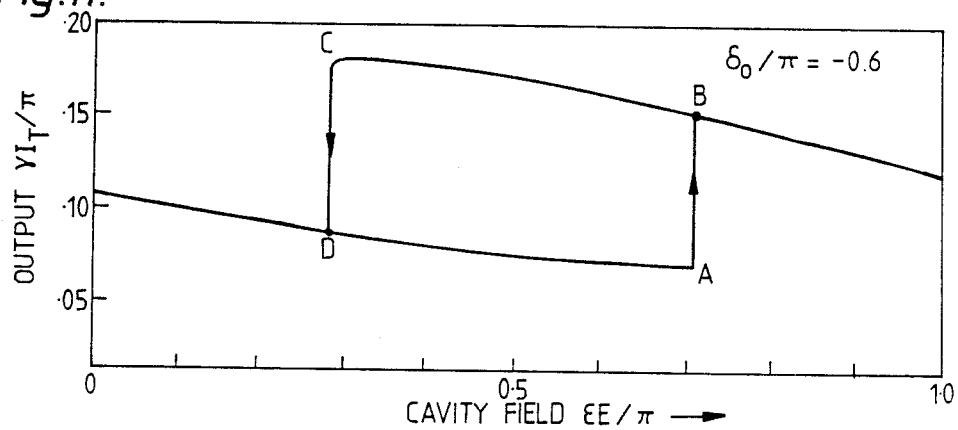
FIG. 11 is a graph similar to FIG. 10 and illustrates the effect on bistability of changing the initial cavity phase.

The optical output does not necessarily return to its original value when the etalon cavity bias voltage is turned off. FIGS. 9 and 10 are equivalent to FIGS. 6 and 7, but now the input intensity is increased to $\gamma I_I = 3\pi$. With an initial phase $\delta_o = 0$, as the voltage is increased the transmission will switch from A to B, but the reverse switch will not occur on reducing the voltage again to 0. The bistable loop in voltage can be retrieved by altering the initial phase (eg by etalon rotation), as illustrated in FIG. 11 for $\delta_o = -0.6\pi$. The loop is enlarged for this higher input power case as compared to the lower power case of FIG. 7.

The advantages of having electrical and nonlinear optical control over a Fabry-Perot etalon are as follows:
(a) Ability to tune the initial phase of the cavity electro-optically gives fine control over the characteristics of nonlinear optical bistable devices.
(b) The occurrence of bistability with voltage offers a binary optical output with voltage at constant optical input or a binary electrically addressable spatial light modulator.
(c) Optical nonlinearity gives fast sweeping of an electrically tunable filter into or out of the high transmission state because of regenerative switching action.

(d) Under the correct initial bias conditions, a nonlinear optical bistable device can be reset by zeroing the voltage, thus avoiding the necessity of interrupting the hold light beam as necessary in prior art devices.
(e) Additional electro-optic feedback may be applied from output or input optical signals to give further switching characteristics.
(f) Reflectivity and transmission are complementary in a Fabry-Perot etalon, if one is high the other is low. Voltage control of this therefore provides electrical selection of one of two light paths to route an optical signal.

Figure 12:
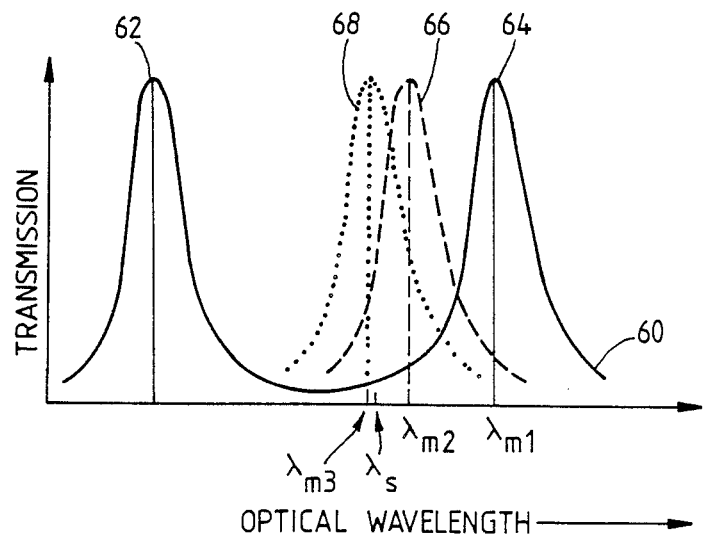
FIG. 12 is a graph of Fabry-Perot etalon transmission against wavelength illustrating fringe shift due to electro-optic and bistable effects.

Referring now to FIG. 12, there is shown a schematic graph of transmission against wavelength for the etalon or optical modulator 10 of FIG. 1. The graph illustrates the mode of operation of the invention in terms of the wavelengths of Fabry-Perot etalon transmission maxima. A solid curve 60 illustrates two adjacent transmission maxima 62 and 64, which correspond to incident light intensity much lower than that required for optical bistability and zero voltage bias across electrodes 22.

The transmission maximum or interference fringe 64 occurs at a wavelength $\lambda_{m1}$. The etalon 10 is illuminated by a light source (beam 26 in FIG. 1) having a wavelength $\lambda_s$. When an appropriate bias voltage $V_B$ is applied across etalon bias connections 22, the etalon transmission maximum 64 is shifted to 66 (chain curve) at a centre wavelength $\lambda_{m2}$. This shift occurs by virtue of electro-optically induced change in cavity material refractive index. The light source 26 is arranged to have sufficient intensity to initiate optical bistability for a fringe maximum at $\lambda_{m2}$, but insufficient intensity to initiate this for a fringe maximum at $\lambda_{m1}$. When the fringe maximum reaches $\lambda_{m2}$, optical nonlinearity of the cavity material produces a further shift in refractive index. For $n_2 < 0$, in accordance with FIG. 12, the fringe centre wavelength is further reduced. The fringe consequently shifts to 68 (dotted line) with centre wavelength $\lambda_{m3}$, which is just beyond $\lambda_s$ relative to $\lambda_{m1}$ and $\lambda_{m2}$. This is a known phenomenon in optical bistability; the fringe maximum passes through the source wavelength so that the latter becomes located just off the fringe centre. The foregoing analysis demonstrates that the criteria for electro-optically induced optical bistability in accordance with the invention may be expressed as follows:

(1) the Fabry-Perot etalon contains optically nonlinear material having an electro-optically tunable refractive index, and includes means such as electrode layers on the etalon mirrors for electrically biassing the cavity material;
(2) at a first etalon bias voltage (eg zero), the etalon has an interference fringe centre at a wavelength $\lambda_{m1}$, and this centre is tunable to $\lambda_{m2}$ by changing the bias voltage;
(3) a light source illuminates the etalon, the source having appropriate wavelength and sufficient intensity to initiate bistable switching at $\lambda_{m2}$ but insufficient intensity for this to occur at $\lambda_{m1}$. It does not matter whether $\lambda_s < \lambda_{m2} < \lambda_{m1}$ as in FIG. 12, or whether $\lambda_s > \lambda_{m2} > \lambda_{m1}$, but in the latter case it is necessary that $n_2 > 0$.

These criteria are enough to produce bistable switching under voltage control. However, as previously indicated with reference to FIGS. 4 to 11, they are not necessarily sufficient to provide for switching in the reverse direction when the bias voltage is reset to its initial value. In this connection, FIG. 10 demonstrates that the initial optical state is not necessarily retrieved. Moreover, the criteria do not necessarily provide for tuning through a complete bistable loop. It may also be convenient, as has been said previously, to tune the etalon phase through $\pi$, which is equivalent to applying sufficient etalon bias voltage to shift the centre of fringe 64 in FIG. 12 to the wavelength of fringe 62. This allows voltage tunability through a whole cycle of etalon cavity phase.

The switching conditions for optical bistability are determined by such parameters as the size of the optical nonlinearity and cavity finesse. The design criteria are well known. They are described by H M Gibbs in the standard textbook previously referred to, and also by:

(a) D A B Miller, IEEE J. Quant. Elec., QE-17, 306 (1981), and
(b) B S Wherrett et al, J. Opt. Soc. Am. B, 3, 351 (1986).

The invention requires that the Fabry-Perot etalon and illuminating light source be initially in states not producing bistability, but the etalon cavity is tunable electro-optically into bistability. If the initial etalon and source states are far from bistability conditions, then a high degree of electro-optic tuning is necessary. This in turn requires either a cavity material with a large electro-optic coefficient, or a high electric field in the cavity, or both. From the prior art of optical bistability, it is a straightforward design exercise to set up an etalon and light source near bistability. Moreover, the change in cavity phase to be produced electro-optically to initiate bistability may then be calculated as described earlier.

The electro-optic coefficient $\xi$ may be defined as the refractive index change $\Delta n$ produced by a change in electric field $\Delta E$, ie $$\xi = \Delta n / \Delta E \tag{12}$$

$\xi$ is related to $\epsilon$, defined in equations (10) and (11) as the electric field dependence of cavity phase, by $$\epsilon = \frac{2\pi t}{\lambda} \xi \tag{13}$$

where t=cavity thickness and $\lambda$=wavelength.
Etalon cavity phase $\delta$ is given by $$\delta = \frac{2\pi nt}{\lambda} \tag{14}$$

where n=refractive index.
Consequently, the change $\Delta\delta$ in cavity phase produced by a change $\Delta n$ in refractive index is given by:

$$\Delta\delta = \frac{2\pi \Delta nt}{\lambda} \tag{15}$$

it may be required to tune the etalon through some fraction f of a complete interference fringe spacing, ie a phase change of $f\pi$ where $0 < f \leq 1$. Therefore $$\Delta\delta = f\pi = \frac{2\pi \Delta nt}{\lambda} \tag{16}$$

Combining equations (12) and (16):

$$\xi = \frac{f\lambda}{2t\Delta E} \quad (17)$$

Since change in etalon bias voltage $\Delta V = t\Delta E$, $$\xi = \frac{f\lambda}{2\Delta V} \quad (18)$$

f may be designed to produce a cavity phase change greater than the width of a bistable loop by selection of a cavity material with sufficiently large $\xi$ for any desired bias voltage change $\Delta V$. The width of the bistable loop of course depends on the cavity material and etalon finesse, and is a matter of design from optical bistability prior art.

For $f=1$, corresponding to etalon tuning through a cavity phase cycle:

$$\xi = \frac{\lambda}{2\Delta V} \quad (19)$$

If it is required that $\Delta V$ be less than 10 Volts, then at an optical wavelength of 1 micron $\xi$ must be greater than $5 \times 10^{-6}$ cm Volt$^{-1}$, which is satisfied by liquid crystals. However, lower values of $\xi$ may be employed with higher values of $\Delta V$ and/or lower values of f, the fraction of a cavity phase cycle through which there is electro-optic tuning.

Figure 13:
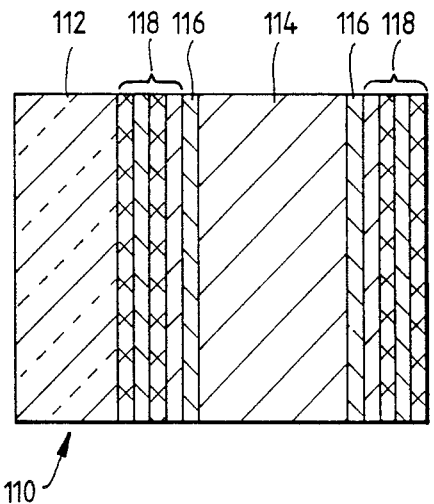
FIG. 13 is a sectional view of an alternative embodiment of the invention incorporating zinc selenide cavity material and dielectric multilayer mirrors.

Referring now to FIG. 13, in which parts equivalent to those previously described are like-referenced with the prefix 100, there is schematically shown a further embodiment 110 of the invention. The embodiment 110 is a Fabry-Perot etalon comprising a 4.3 micron thick cavity layer 114 of ZnSe sandwiched between successively disposed layers of ITO electrodes 116 and dielectric multilayer mirrors 118, this structure being supported by a glass plate 112. Each mirror 118 consists of four quarter-wavelength dielectric layers, two zinc selenide layers arranged alternatively with two thalium fluoride layers. This arrangement provides mirror reflectivities of $R_F \approx 0.78$ and $R_B \approx 0.72$ at 514 nm. The cavity layer 114 was grown by molecular beam epitaxy at pressures in the range $2-8 \times 10^{-9}$ mbar, growth rates 0.6-0.9 microns/hour and substrate temperatures of 30°-40° C. The molecular beam was generated from a Knudsen cell source containing ultra-high purity ZnSe prepared by chemical vapour deposition from zinc vapour and hydrogen selenide. This arrangement exhibits switching or optical bistability at 8 mWatts of 520 nm wavelength light under zero bias voltage.

Figure 16:
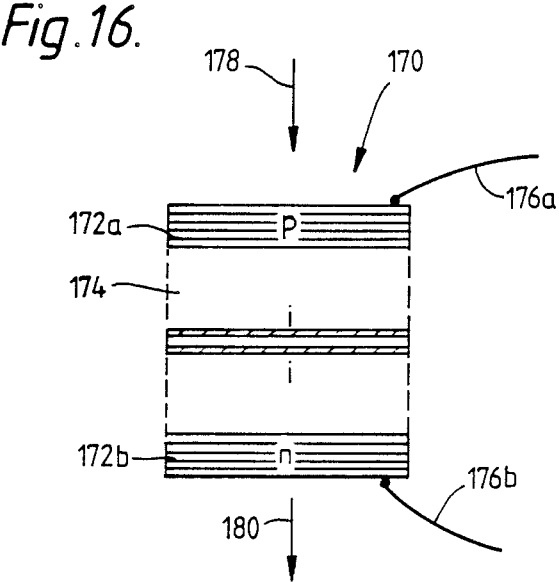
FIGS. 14 to 16 schematically illustrate embodiments of the invention based on multiple quantum well structures.
Figure 14:
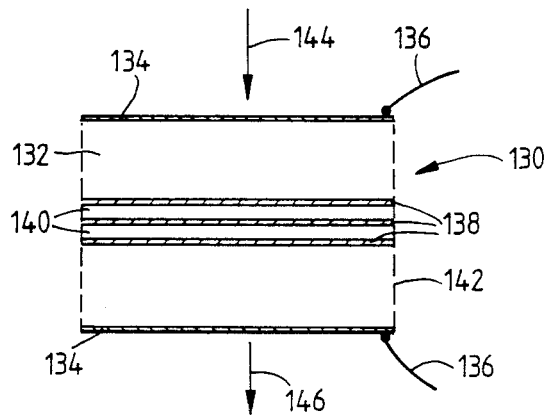
Figure 15:
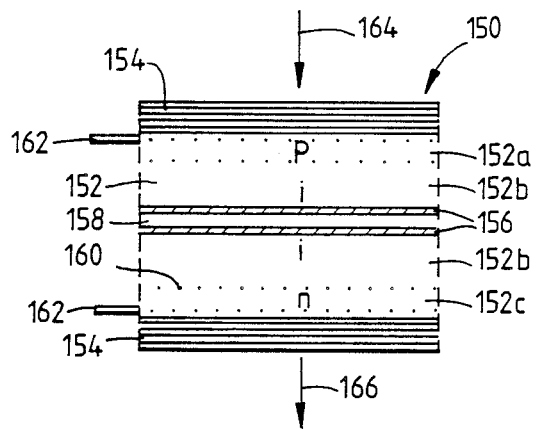

Referring now to FIGS. 14, 15 and 16, which are not to scale, there are shown schematically illustrated embodiments of the invention incorporating multiple quantum well (MQW) structures. In FIG. 14, an etalon 130 is shown comprising an MQW structure 132 beween partially reflecting metal mirrors 134 with respective electrical bias connections 136. The MQW structure 132 is 3 $\mu$m thick, and comprises 100 GaAs layers each 10 nm thick arranged alternately with 100 AlGaAs layers each 20 nm thick. Three GaAs layers 138 and two AlGaAs layers 140 are shown (not to scale) the presence of others being indicated by chain lines such as 142. Incident and transmitted light are indicated by arrows 144 and 146.

FIG. 15 shows an etalon 150 comprising an MQW structure 152 between dielectric mirrors 154 consisting of quarter-wave layers. The MQW structure 152 consists of layers such as 156 and 158, and is equivalent in chemical species and number of layers to structure 132 of etalon 130. However, the structure 152 has non-uniform doping to provide PIN diode characteristics. It consists of a p-type region 152a, an intrinsic or i region 152b and an n-type region 152c, these regions being illustrated as delimited by dotted lines such as 160. Electric bias connections 162 are provided to the p and n type regions 152a and 152c. Incident and transmitted light are indicated by arrows 164 and 166. In operation the PIN diode is reverse biased.

FIG. 16 shows a further etalon 170 comprising quarter-wave dielectric stacks 172a and 172b providing etalon mirrors. The mirrors 172a and 172b contain therebetween an MQW structure 174 equivalent to structures 132 and 152 and composed of AlAs layers arranged alternately with AlGaAs layers. The MQW structure 174 is of intrinsic or i conductivity; the mirrors 172a and 172b are p-type and n-type respectively to produce a PIN diode structure, and have electrical bias connections 176a and 176b. Incident and transmitted light are indicated by arrows 178 and 180.

The etalons 130, 150 and 170 of FIGS. 14 to 16 operate in an equivalent manner. GaAs—AlGaAs MWQ structures exhibit a nonlinear refraction for photon energies close to the semiconductor bandgap energy. The nonlinearity is of electronic origin, as opposed to the thermal equivalent of the FIG. 1 embodiment, and occurs on a faster timescale. In other aspects the etalons 130, 150 and 170 operate in a similar manner to that of FIG. 1. A bias voltage applied across the electrical connections 136 of the etalon 130 produces an electric field in the MQW structure 132, which produces an associated shift in the absorption edge and the refractive index by virtue of the quantum confined Stark effect. In addition, optical bistability occurs due both to optical filling of conduction bands with electrons and to saturation of excitonic absorption. The etalon 130 is accordingly tunable by applied voltage to induce optical bistability in accordance with the invention. Similar effects can be obtained in bulk semiconductors by virtue of the Franz Keldysh effect.

The etalons 150 and 170 operate in a similar manner to etalon 130. A bias voltage applied across the electrical connections 162 or 176a/176b produces an electric field appearing predominantly in the i region 152b or 174. This produces a refractive index change and voltage-tunable bistability as before.

Further details on the characteristics of MQW structures may be obtained from the following references:
(a) Gibbs et al, Appl. Phys. Lett. 41 (3) pp 221-2 (August 1983).
(b) Miller et al, Appl. Phys. Lett. 45 (1) pp 13-15 (July 1984).
(c) Gourley, Superlattices and Microstructures 1 (3) pp 227-30 (1985).

We claim:
1. An optically bistable device including a Fabry-Perot etalon containing intracavity optically nonlinear material and arranged to exhibit optical bistability, and wherein:
   (1) the cavity material refractive index is electro-optically tunable via etalon biassing means to move an etalon interference fringe maximum from a wavelength $\lambda_{m1}$ to a wavelength $\lambda_{m2}$,
   (2) a light source having a wavelength $\lambda_s$ is arranged to pass light through the etalon, where $\lambda_{m2}$ lies between $\lambda_{m1}$ and $\lambda_s$, $\lambda_s$ and the source intensity being arranged to initiate optical bistability at an etalon fringe wavelength of $\lambda_{m2}$ but to be inappropriate for bistability at a fringe wavelength of $\lambda_{m1}$, and (3) the etalon biassing means are connected to a variable voltage source arranged at least for etalon fringe maximum tuning from $\lambda_{m1}$ to $\lambda_{m2}$.

2. A device according to claim 1 wherein the etalon cavity material has an optical nonlinearity parameter $n_2$ at least equal to $10^{-6}$ cm$^2$/Watt and an electro-optic coefficient and thickness appropriate for cavity phase tuning through at least a bistable loop in response to a bias voltage change of 10 Volts.

3. A device according to claim 2 wherein the cavity material is a liquid crystal material having a birefringence of at least 0.05.

4. A device according to claim 3 wherein the birefringence is in the range 0.09 to 0.11.

5. A device according to claim 3 or 4 wherein the cavity material is optically absorbing to a degree sufficient to effect temperature rise as required for optical bistability, and the etalon mirrors are of dielectric multilayer construction.

6. A device according to claim 1 having partially absorbing etalon mirrors to effect temperature rise and produce optical bistability.

7. A device according to claim 1 wherein the etalon cavity material is a multiple quantum well structure.

8. A method of obtaining optical bistability including the steps of:

(1) providing a Fabry-Perot etalon arranged for optical bistability and containing intracavity optically nonlinear material, the cavity material refractive index being electro-optically tunable via etalon biassing means to move an etalon interference fringe maximum from a wavelength $\lambda_{m1}$ to a wavelength $\lambda_{m2}$, (2) illuminating the etalon with light having a wavelength $\lambda_s$, where $\lambda_{m2}$ lies between $\lambda_{m1}$ and $\lambda_s$, $\lambda_s$ and the light intensity being arranged to initiate bistability at an etalon fringe wavelength of $\lambda_{m2}$ but to be inappropriate for bistability at a fringe wavelength of $\lambda_{m1}$, and (3) altering etalon bias to produce etalon fringe maximum tuning from $\lambda_{m1}$ to $\lambda_{m2}$.

* * * * *